(12) United States Patent
Yang

(10) Patent No.: US 8,320,963 B2
(45) Date of Patent: Nov. 27, 2012

(54) SUBSCRIBER IDENTITY MODULE CARD AND TERMINAL DEVICE HAVING THE SAME

(75) Inventor: Chee-hwan Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1121 days.

(21) Appl. No.: 12/062,639

(22) Filed: Apr. 4, 2008

(65) Prior Publication Data

US 2009/0069048 A1 Mar. 12, 2009

(30) Foreign Application Priority Data

Sep. 6, 2007 (KR) .................. 10-2007-0090455

(51) Int. Cl.
*H04B 1/38* (2006.01)
(52) U.S. Cl. ............... 455/558; 455/550.1; 439/607.22; 361/728; 361/737
(58) Field of Classification Search .................. None
See application file for complete search history.

(56) References Cited

U.S. PATENT DOCUMENTS

| | | | | |
|---|---|---|---|---|
| 5,708,799 | A * | 1/1998 | Gafken et al. | 710/301 |
| 6,226,189 | B1 * | 5/2001 | Haffenden et al. | 361/814 |
| 2001/0016040 | A1 * | 8/2001 | Imura | 379/354 |
| 2002/0179706 | A1 * | 12/2002 | Nishigata et al. | 235/441 |
| 2005/0252978 | A1 * | 11/2005 | Nishizawa et al. | 235/492 |
| 2006/0142063 | A1 * | 6/2006 | Monsacre | 455/558 |
| 2006/0183355 | A1 * | 8/2006 | Nishizawa et al. | 439/60 |

FOREIGN PATENT DOCUMENTS

JP 2005-149360 6/2005
KR 10-2002-0080796 A 10/2002

OTHER PUBLICATIONS

Machine translation of KR 2002-0080796, published on Oct. 26, 2002.*

* cited by examiner

Primary Examiner — Rafael Pérez-Gutiérrez
Assistant Examiner — Suhail Khan
(74) Attorney, Agent, or Firm — Jefferson IP Law, LLP

(57) ABSTRACT

A subscriber identity module (SIM) card to be mounted to a terminal device that includes a SIM interface unit, the SIM card including: a first terminal to output a control signal indicating that the SIM card is mounted to the terminal device when the SIM card is mounted to the terminal device; and a second terminal to receive the control signal from the first terminal, and to transmit, to the SIM interface unit, the control signal when the SIM card is mounted to the terminal device.

19 Claims, 3 Drawing Sheets

SUBSCRIBER IDENTITY MODULE CARD AND TERMINAL DEVICE HAVING THE SAME

CROSS-REFERENCE TO RELATED APPLICATION

This application claims the benefit of Korean Application No. 2007-90455, filed Sep. 6, 2007 in the Korean Intellectual Property Office, the disclosure of which is incorporated herein by reference.

BACKGROUND OF THE INVENTION

1. Field of the Invention

Aspects of the present invention relate to a subscriber identity module card and a terminal device having the same.

2. Description of the Related Art

A subscriber identity module (SIM) card is inserted to a portable terminal device (such as a cellular telephone, a personal digital assistant (PDA), a notebook computer, etc.) that is provided with a communicating function. The SIM card is a specific card of a global system for mobile communication (GSM) performing an interface function between the terminal device and a network. Furthermore, the SIM card includes various types of information about a user, such as a unique number, an account number, a registered telephone number, personal certification information, etc. If the user turns on the terminal device after mounting the SIM card to the terminal device, the terminal device communicates with the network using the information included in the SIM card, whereby the user is capable of using only a terminal device approved by the network.

For preventing an unfair using or malfunction of the SIM card, the terminal device determines in real time whether the SIM card is mounted. In general, the terminal device includes an SIM card connector to which the SIM card is connected, an SIM interface to communicate with the SIM card, and a switch to detect whether the SIM card is physically connected to the SIM connector. If the SIM card is inserted into the SIM connector, the switch is turned on so that electric information about the insertion of the SIM card is supplied to the SIM interface. Accordingly, the SIM interface can determine whether the SIM card is mounted.

Another method to determine whether the SIM card is mounted includes checking at predetermined time intervals whether the SIM card is mounted. Although this method has a superior reliability because this method directly checks whether the SIM card is mounted, determining by time intervals whether the SIM card is mounted interferes with a normal operation of the SIM card.

SUMMARY OF THE INVENTION

Aspects of the present invention provide a subscriber identity module (SIM) card and a terminal device having the same to correctly determine whether the SIM card is mounted in the terminal device. Aspects of the present invention further provide a terminal device having a simple configuration to reduce a manufacturing component. Aspects of the present invention still further provide a terminal device preventing malfunction by effectively determining whether an SIM card is mounted.

According to an aspect of the present invention, there is provided an SIM card to be mounted in a terminal device that includes an SIM interface unit, the SIM card including: a first terminal to output a control signal indicating that the SIM card is mounted to the terminal device when the SIM card is mounted to the terminal device; and a second terminal to receive the control signal from the first terminal, and to transmit, to the SIM interface unit, the control signal when the SIM card is mounted to the terminal device.

The first terminal and the second terminal may be connected to each other.

The first terminal may connect to a grounding terminal when the SIM card is mounted to the terminal device.

According to another aspect of the present invention, there is provided an SIM card to be mounted to a terminal device that includes an SIM interface unit, the SIM card including: a first terminal to connect to a grounding terminal, and to output a control signal caused by the grounding terminal; and a second terminal that is short-circuited to the first terminal to receive the control signal, and to transmit the control signal to the SIM interface unit when the SIM card is mounted in the terminal device.

According to another aspect of the present invention, there is provided a terminal device, including: a card connector; an SIM interface unit; and an SIM card including: a first terminal to output a control signal when the SIM card is mounted to the card connector, and a second terminal to receive the control signal and to transmit the control signal to the SIM interface unit.

The SIM interface unit may determine whether the subscriber identity module card is mounted according to the control signal that is transmitted from the second terminal.

The first terminal may be connected to a grounding terminal if the SIM card is mounted to the card connector.

According to yet another aspect of the present invention, there is provided a terminal device, including: an SIM card including a first pin, and a second pin that is connected with the first pin; a grounding terminal that is connected to the first pin; and an SIM interface unit that is connected to the second pin, and determines that the SIM card is mounted if an electric signal is inputted from the second pin.

According to still another aspect of the present invention, there is provided a subscriber identity module (SIM) card to be mounted to a terminal device that comprises an SIM interface unit, the SIM card including: a terminal to output a control signal to the SIM interface indicating that the SIM card is mounted to the terminal device when the SIM card is mounted to the terminal device.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
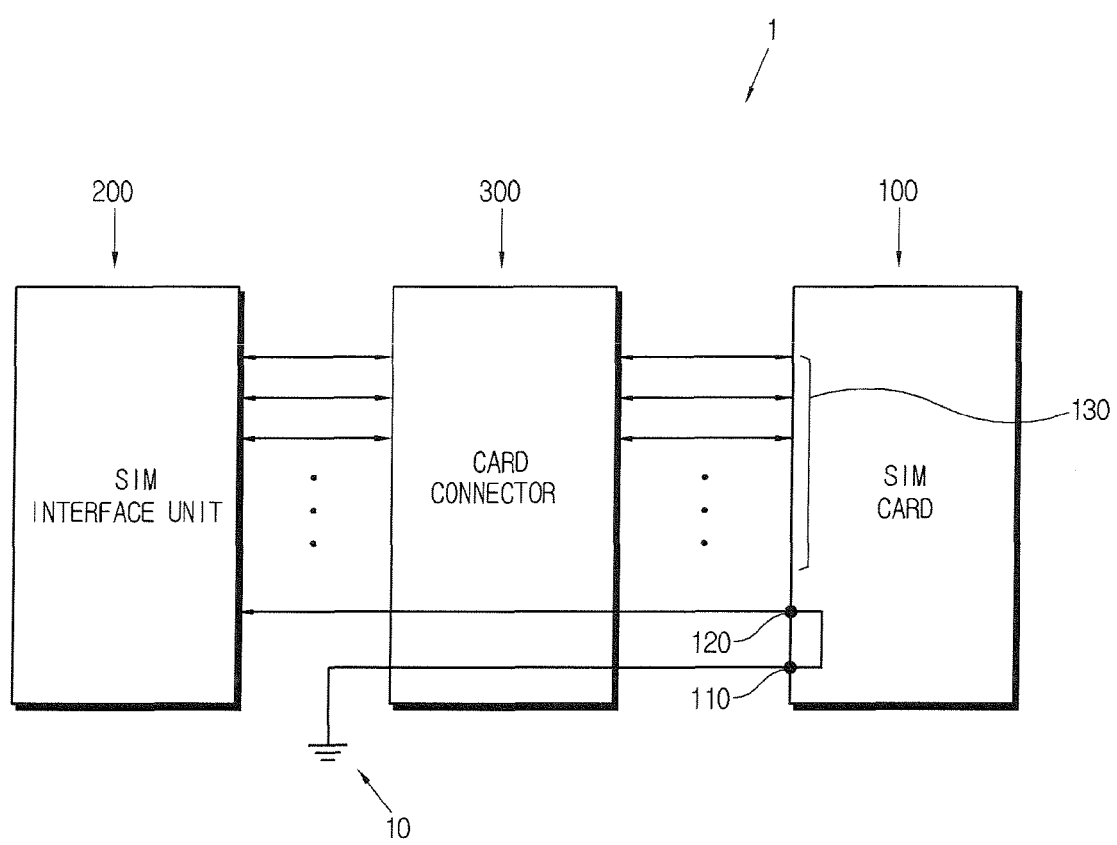
FIG. 1 is a control block diagram of a terminal device according to an embodiment of the present invention.

Reference will now be made in detail to the present embodiments of the present invention, examples of which are illustrated in the accompanying drawings, wherein like reference numerals refer to like elements throughout. The exemplary embodiments are described below in order so as to explain the present invention by referring to the figures.

FIG. 1 is a control block diagram of a terminal device according to an embodiment of the present invention. The terminal device 1 may be, for example, a portable telephone, a personal digital assistant (PDA), a notebook computer, etc., that is provided with a communicating function.

Referring to FIG. 1, the terminal device 1 includes a subscriber identity module (SIM) card 100 (hereinafter, referred to as an SIM card 100), a card connector 300 to which the SIM card 100 is inserted, and an SIM interface unit 200. The SIM interface unit 200 and the card connector 300 are provided on a main body (not shown) of the terminal device 1, and the SIM card 100 is detachably mounted to the main body of the terminal device 1.

The SIM card 100 is a card of a global system for mobile communication (GSM) that performs an interface function between the terminal device 1 and a network (not shown). Furthermore, the SIM card 100 includes various types of information about a user, such as a unique number, an account number, a registered telephone number, a personal certification information, etc. If the user turns on the terminal device 1 after mounting the SIM card 100 to the main body of the terminal device 1, the terminal device 1 communicates the information included in the SIM card 100 to an external network such as a server.

The SIM card 100 includes a plurality of terminals 110, 120 and 130 inserted or mounted to the main body of the terminal device 1 to enable communication. A first terminal 110 and a second terminal 120 of the SIM card 100 are short-circuited to each other inside the SIM card 100. The first terminal 110 is connected to a grounding terminal 10, and the second terminal 120 is connected to the SIM interface unit 200. If the SIM card 100 is mounted to the terminal device 1, the first terminal 110 is connected to the grounding terminal 10, and a specific electric signal is inputted to the SIM interface unit 200 through the second terminal 120 that is connected to the first terminal 110.

Conventionally, if an SIM card is mounted to a terminal device, a physical switch is used to determine whether the SIM card is mounted correctly. If the SIM card is correctly inserted to the terminal device, the switch physically connects to a grounding terminal, such that an inner control unit can determine whether the SIM card is inserted. When using the conventional switch, it is difficult to miniaturize the terminal device due to the hardware configuration, and a manufacturing cost increases. Furthermore, if an operation of the switch is not correct, a reliability of communication with the SIM card deteriorates. Also, since the switch may be grounded when other objects aside from the SIM card are inserted to the terminal device, the terminal device may malfunction.

According to aspects of the present invention, the surplus terminals 110 and 120 are inherently provided in the SIM card 100. That is, the surplus terminals 110 and 120 are not separate components (such as the conventional switch) and are used to inform the SIM interface unit 200 whether the SIM card 100 is mounted. If the SIM card 100 is mounted to the terminal device 1, the first terminal 110 connects to the grounding terminal 10 causing an electric signal corresponding to the grounding to be output to the connected second terminal 120. The signal corresponding to the grounding may be referred to as a control signal. The first terminal 110 connects to the grounding terminal 10 through the main body of the terminal device 1 via the card connector 300. However, it is understood that aspects of the present invention are not limited thereto. For example, the first terminal 110 may alternatively be connected to a grounding terminal 10 inside the SIM card 100.

The second terminal 120 receiving the electric signal from the first terminal 110 transmits the electric signal to the SIM interface unit 200. Since the control signal (i.e., the electrical signal) informing that the SIM card 200 is mounted is supplied from the SIM card 200 (rather than a switch), it can be determined whether the SIM card 200 is mounted as soon as the SIM card 200 is mounted or detached. Furthermore, other objects that are inserted will not transmit a control signal. As a result, the SIM card 200 can be prevented from being incorrectly determined to be inserted. In particular, since it can be correctly determined whether the SIM card 200 is mounted as soon as the SIM card 200 is inserted, the reliability of supplying power to the SIM card 200 and starting communication can be improved.

The third terminal 130 includes a plurality of terminals, communicates with the SIM interface unit 200 to receive power, and transmits information (such as the unique number, the account number, the registered telephone number, the personal certification information, etc.).

The card connector 300 is a component through which the SIM card 100 is connected to the main body of the terminal device 1. The card connector 300 may have various known connecting configurations (for example, magnets, latches, and female/male connectors), and/or may be provided as a slot type. The card connector 300 may include an electric lead line (not shown) to connect the terminals 110, 120 and 130 of the SIM card 100 with other external terminals.

If the SIM card 100 is mounted, the SIM interface unit 200 supplies power to the SIM card 100, and receives various types of information to communicate with the network. The SIM interface unit 200 may be provided as one of various known interface chips to communicate with the SIM card 100, and has a control function to determine whether the SIM card 100 is mounted.

According to other aspects of the present invention, the first terminal 110 may be connected to a power terminal having levels other than the grounding terminal 10. It is understood that as long as a specific electric signal is outputted through the second terminal 120, the SIM interface unit 200 can determine whether the SIM card 100 is mounted.

Figure 2:
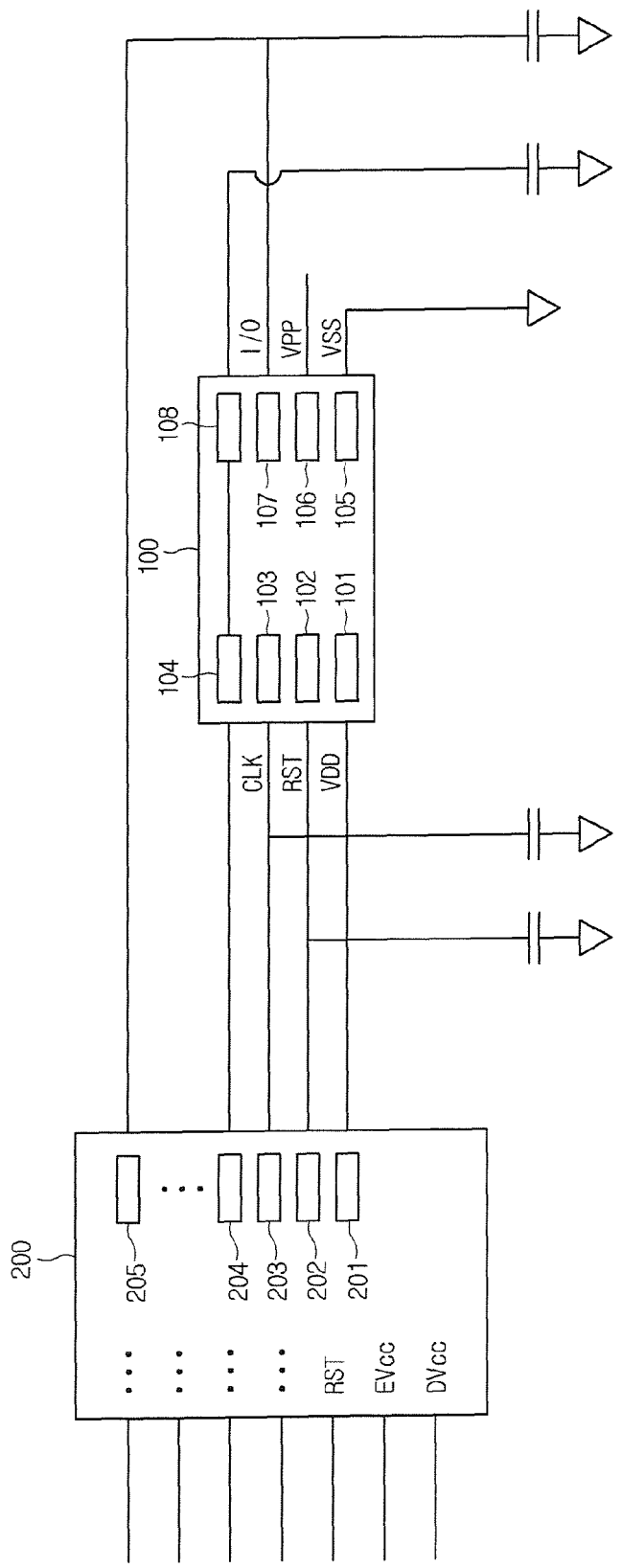
FIG. 2 is a schematic circuit diagram of a terminal device according to an embodiment of the present invention.

FIG. 2 is a schematic circuit diagram of a terminal device according to an embodiment of the present invention. Referring to FIG. 2, the card connector 300 is not illustrated, and the terminals of the SIM card 100 and the SIM interface unit 200 are illustrated. Specifically, the SIM card 100 includes eight pins 101 to 108. An eighth pin 108 corresponds to the first terminal 110 in FIG. 1, a fourth pin 104 corresponds to the second terminal 120 in FIG. 1, and the other pins 101 to 103, and 105 to 107 correspond to the third terminal 130. A first pin 101 receives power Vdd, a second pin 102 is a reset terminal RST, and a third pin 103 is a clock terminal CLK. Furthermore, a fifth pin 105 is a grounding terminal Vss, a sixth pin 106 is a power terminal Vpp, and a seventh pin 107 corresponds to an I/O terminal. The fourth pin 104 and the eighth pin 108 may be revised for future use (RFU) terminals to perform a radio frequency (RF) function if an antenna is connected. Accordingly, the surplus pins 104 and 108 not in use are short-circuited to each other, and a first side thereof is connected to the grounding terminal 10 and a second side thereof is connected to the SIM interface unit 200 so that the SIM card 100 can directly supply a control signal to the SIM interface unit 200.

The SIM interface unit 200 includes a plurality of pins 201 to 205, and is electrically connected to the SIM card 100. In the plurality of pins 201 to 205, a fourth pin 204 corresponds to a card existence recognizing pin connected to the fourth pin 104 of the SIM card 100. If the SIM card 100 is not mounted, the fourth pin 204 maintains a first state (for example, a high state). If the SIM card 100 is mounted, the fourth pin 204 is changed to a second state (for example, a low state) since the eighth pin 108 of the SIM card 100 contacts the grounding terminal 10. If the SIM card 100 is separated from the terminal device 1, the fourth pin 204 is changed to the first state (for example, the high state). As describe above, whether the SIM card 100 is mounted can be determined by electrical contact instead of a physical switch function.

Alternatively, the fourth pin 104 of the SIM card 100 may be short-circuited with the fifth pin 105 (which, in this case, is the grounding terminal) instead of the eighth pin 108. However, it is understood that aspects of the present invention are not limited thereto, and the SIM card 100 may have other configurations instead of the short-circuiting in order to electrically connect the fourth pin 104 and other pins 105 or 108.

Figure 3:
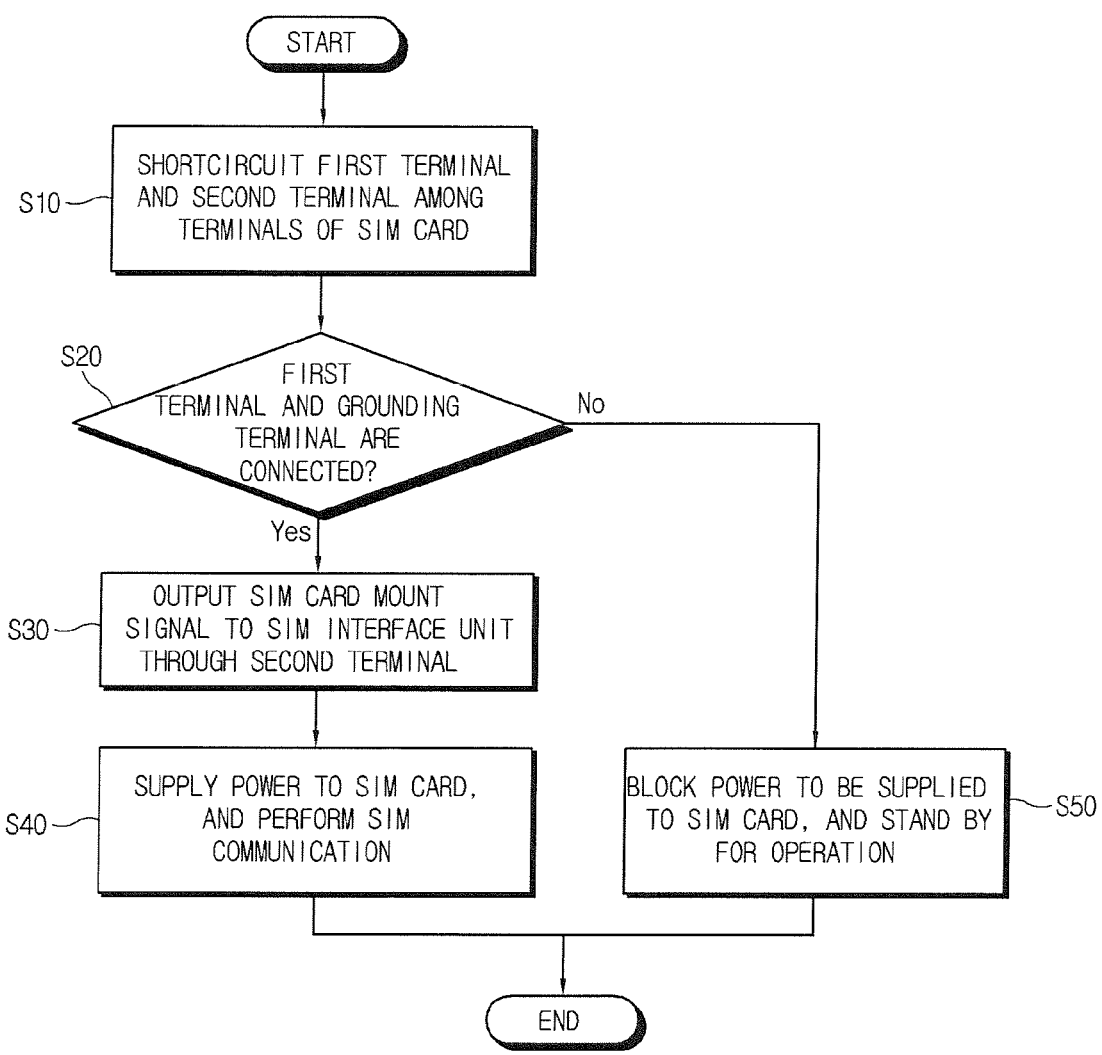
FIG. 3 is a control flowchart illustrating a control method of a terminal device according to an embodiment of the present invention.

FIG. 3 is a control flowchart illustrating a control method of a terminal device according to an embodiment of the present invention. Hereinafter, a method for determining whether the SIM card 100 is mounted to the terminal device 1 will be described with reference to FIG. 3.

Referring to FIGS. 1 and 3, the first terminal 110 is short-circuited to the second terminal 120 to electrically connect specific terminals among a plurality of terminals of the SIM card 100 in operation S10.

Then, in operation S20, it is determined whether the first terminal 110 is connected to the grounding terminal 10 in order to determine whether the SIM card 100 is mounted to the terminal device 1.

If the first terminal 110 and the grounding terminal 10 are connected, a control signal indicating that the SIM card is mounted is outputted from the first terminal 110 to the SIM interface unit 200 through the second terminal 120 in operation S30. The SIM interface unit 200 receives the control signal, and supplies power to the SIM card 100 to perform a SIM communication if the SIM interface unit 200 determines that the SIM card 100 is normally mounted to the terminal device 1 in operation S40.

On the other hand, if the first terminal 110 is not connected to the grounding terminal 10, the SIM card 100 is determined to not be mounted since the SIM interface unit 200 receives no signal from the second terminal 120. In this case, power is not supplied to, or is blocked from, the SIM card 100, and the SIM communication maintains an operation standby state in operation S50.

According to aspects of the present invention, a terminal device 1 includes an SIM card 100 having two terminals 110 and 120 that are short-circuited to each other so as to determine whether the SIM card 100 is mounted without a physical component (such as a switch).

As described above, aspects of the present invention provide a SIM card and a terminal device receiving the same to correctly determine whether the SIM card is mounted in the terminal device. Also, aspects of the present invention provide a terminal device having a simple configuration, thus reducing a manufacturing cost. Furthermore, aspects of the present invention provide a terminal device that avoids malfunction due to determining whether a SIM card is mounted.

Although a few embodiments of the present invention have been shown and described, it will be appreciated by those skilled in the art that changes may be made in this embodiment without departing from the principles and spirit of the invention, the scope of which is defined in the claims and their equivalents.

What is claimed is: ,

1. A subscriber identity module (SIM) card to be mounted to a terminal device that comprises a SIM interface unit, the SIM card comprising:
    a first terminal connected to a grounding terminal within the SIM card which causes the first terminal to output a control signal indicating that the SIM card is mounted to the terminal device when the SIM card is mounted to the terminal device; and
    a second terminal connected to the SIM interface unit to receive the control signal from the first terminal, and to transmit, to the SIM interface unit, the control signal when the SIM card is mounted to the terminal device,
    wherein the second terminal maintains a first state if the SIM card is not mounted and changes to a second state if the SIM card is mounted.

2. The SIM card as claimed in claim 1, wherein the first terminal and the second terminal are connected to each other.

3. The SIM card as claimed in claim 2, wherein the first terminal is short-circuited to the second terminal.

4. The SIM card as claimed in claim 1, wherein:
    the first terminal connects to the grounding terminal when the SIM card is mounted to the terminal device; and
    the grounding terminal causes the control signal to be output from the first terminal.

5. The SIM card as claimed in claim 1, wherein the grounding terminal causes the first terminal to output the control signal to the second terminal.

6. The SIM card as claimed in claim 1, further comprising one or more third terminals, different from the first terminal and the second terminal, to receive power from the terminal device and to transmit data to the terminal device.

7. The SIM card as claimed in claim 1, wherein the first terminal and/or the second terminal is a revised for future use (RFU) terminal.

8. A subscriber identity module (SIM) card to be mounted to a terminal device that comprises a SIM interface unit, the SIM card comprising:
    a first terminal to connect to a grounding terminal within the SIM card, and to output a control signal caused by the grounding terminal; and
    a second terminal that is short-circuited to the first terminal to receive the control signal, and connected to the SIM interface unit to transmit the control signal to the SIM interface unit when the SIM card is mounted in the terminal device,
    wherein the second terminal maintains a first state if the SIM card is not mounted and changes to a second state if the SIM card is mounted.

9. The SIM card as claimed in claim 8, wherein the first terminal connects to the grounding terminal when the SIM card is mounted to the terminal device, and disconnects from the grounding terminal when the SIM card is dismounted from the terminal device.

10. The SIM card as claimed in claim 8, further comprising one or more third terminals, different from the first terminal and the second terminal, to receive power from the terminal device and to transmit data to the terminal device.

11. A terminal device, comprising:
    a card connector;
    a subscriber identity module (SIM) interface unit; and
    a SIM card comprising:
        a first terminal connected to a grounding terminal within the SIM card which causes the first terminal to output a control signal indicating that the SIM card is mounted to the card connector when the SIM card is mounted to the card connector, and a second terminal connected to the SIM interface unit to receive the control signal from the first terminal, and to transmit, to the SIM interface unit, the control signal when the SIM card is mounted to the card connector, wherein the second terminal maintains a first state if the SIM card is not mounted and changes to a second state if the SIM card is mounted.

12. The terminal device as claimed in claim 11, wherein the SIM interface unit determines whether the SIM card is mounted according to the control signal that is transmitted from the second terminal.

13. The terminal device as claimed in claim 11, wherein:

the first terminal connects to a grounding terminal when the SIM card is mounted to the card connector; and the grounding terminal causes the control signal to be output from the first terminal.

14. The terminal device as claimed in claim 11, wherein the SIM card further comprises a grounding terminal to cause the first terminal to output the control signal the second terminal.

15. The terminal device as claimed in claim 11, wherein the SIM card further comprises one or more third terminals, different from the first terminal and the second terminal, to receive power from the terminal device and to transmit data to the terminal device.

16. A terminal device, comprising:

a subscriber identity module (SIM) card comprising a first pin, a second pin connected to the first pin, and a grounding terminal to connect to the first in and to cause a control signal to be output from the first in to the second pin; and a SIM interface unit to connect to the second pin when the SIM card is mounted in the terminal device, and to determine that the SIM card is mounted if the control signal is transmitted from the second pin.

17. A subscriber identity module (SIM) card to be mounted to a terminal device that comprises a SIM interface unit, the SIM card comprising:

a second terminal connected to the SIM interface unit to output a control signal, from a first terminal connected to a grounded terminal within the SIM card, to the SIM interface indicating that the SIM card is mounted to the terminal device when the SIM card is mounted to the terminal device, wherein the second terminal maintains a first state if the SIM card is not mounted and changes to a second state if the SIM card is mounted.

18. The SIM card as claimed in claim 17, wherein:

the terminal connects to a grounding terminal when the SIM card is mounted to the terminal device; and the grounding terminal causes the control signal to be output from the first terminal.

19. The SIM card as claimed in claim 17, wherein the grounding terminal causes the first terminal to output the control signal.

* * * * *